United States Patent [19]

Worcester et al.

[11] Patent Number: 5,122,408
[45] Date of Patent: Jun. 16, 1992

[54] TWO-SIDED LEAD COMPOSITE AND METHOD OF MAKING SAME

[75] Inventors: Anthony W. Worcester, Oakville; John T. O'Reilly, Barnhart, both of Mo.

[73] Assignee: The Doe Run Company, St. Louis, Mo.

[21] Appl. No.: 606,589

[22] Filed: Oct. 31, 1990

[51] Int. Cl.⁵ .................... B32B 3/00; B32B 15/00
[52] U.S. Cl. .................... 428/161; 427/360; 427/367; 428/162; 428/164; 428/213; 428/215; 428/263; 428/269
[58] Field of Search .......... 428/161, 162, 164, 213, 428/215, 263, 269; 427/360, 367

[56] References Cited

U.S. PATENT DOCUMENTS

| | | | |
|---|---|---|---|
| 3,536,480 | 10/1970 | Winkler | 428/319.1 |
| 3,833,951 | 9/1974 | Hurwitz | 428/319.1 |
| 4,097,625 | 6/1978 | Lunn et al. | 427/360 |
| 4,902,550 | 2/1990 | Shickel | 428/319.1 |

Primary Examiner—William J. Van Balen
Attorney, Agent, or Firm—Armstrong, Teasdale, Schlafly & Davis

[57] ABSTRACT

A composite lead sheet product comprising a layer of lead or lead alloy having first and second surfaces. A first layer of a porous, non-metallic material is mechanically bonded to the first surface of the lead layer, and a second layer of porous, non-metallic material is mechanically bonded to the second surface of the lead layer. The method of making the composite of this invention comprises supporting a first layer of a porous, non-metallic sheet material on a heat sink. Molten lead or lead alloy is dispensed transversely across the first layer. A second layer of a porous, non-metallic sheet material is applied over the dispensed molten lead. The second layer is pressed into the molten lead, and the molten lead is pressed into the first layer with a roller, to mechanically bond the first and second layers to the lead.

6 Claims, 2 Drawing Sheets

TWO-SIDED LEAD COMPOSITE AND METHOD OF MAKING SAME

BACKGROUND OF THE INVENTION

This invention relates to a two-sided lead composite, and to a method of making a two-sided lead composite.

Lead (and its alloys) is a very useful and important metal. Because of its high density and good damping characteristics, lead has excellent sound attenuating characteristics, and is very useful in sound proofing. Also because of its high density, lead is very useful in radiation shielding. Furthermore, because of its unique chemical properties, lead is virtually an indispensable material for batteries. Recognizing these and other important uses for lead, U.S. Pat. No. 4,097,625 (incorporated herein by reference) discloses a lead coated substrate, and a method and apparatus for thin coating substrates with lead and other metals to provide sound attenuation, and moisture and corrosion protection.

However, because of increasing concern about the effects of lead exposure, and the use of lead is sometimes avoided even where it would be extremely beneficial. In particular, lead is rarely used where the metal would be exposed.

SUMMARY OF THE INVENTION

The present invention relates to a two-sided lead composite comprising a layer of lead or lead alloy having first and second surfaces, and a thickness of between about 0.001 and about 0.050 inches. A first layer of a porous, non-metallic material is mechanically bonded to the first surface of the lead layer, and a second layer of porous, non-metallic material is mechanically bonded to the second surface of the lead layer. Thus the lead layer is sandwiched or enclosed between the first and second layers. These layers are mechanically bonded to the lead. i.e. by solidifying the molten lead to engage the material forming the layers, and cannot easily be removed.

In addition to covering and enclosing the lead, the first and second layers facilitate the use of the two-sided lead composite. One side of the two-sided composite can be readily adhered to walls or other surfaces for sound attenuation or radiation shielding, and a protective covering, such as a wall covering, can be readily adhered to the other side of the composite. Thus, the benefits of lead shielding are achieved without any exposed metal. Moreover, the composite with its porous, non-metallic exterior layers is more easily secured, for example with an adhesive, than a bare metal surface.

The two-sided lead composite is also particularly advantageous in batteries, where the composite can be used as a battery grid. It is important that the grids in a battery do not touch and electrically short. Yet for compactness it is desirable to make the grids as thin as possible and space the grids as close as possible. The two-sided composite of this invention is well suited for use as a battery grid because the first and second layers reinforce the lead layer, preventing creep or other deformation of lead even where the lead is very thin. Furthermore, sheets of the composite can be stacked close together and the first and second layers will electrically separate the lead layers, preventing the lead layers from shorting.

The two-sided composite can be quickly, easily, and inexpensively made by supporting a first layer of a porous, non-metallic substance on a heat sink. Molten lead is then dispensed transversely across this first layer. A second layer of a porous, non-metallic substance is applied over the molten lead. The second layer is then pressed into the molten lead and the molten lead is pressed into the first layer with a roller to mechanically bond the layers.

This process is relatively quick and easy, and could readily be adapted to a continuous process.

These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
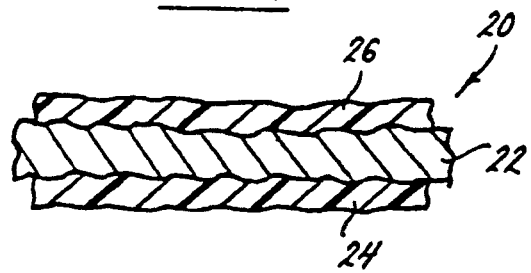
FIG. 1 is a cross sectional view of through a two-sided lead composite of the present invention.
Figure 2:
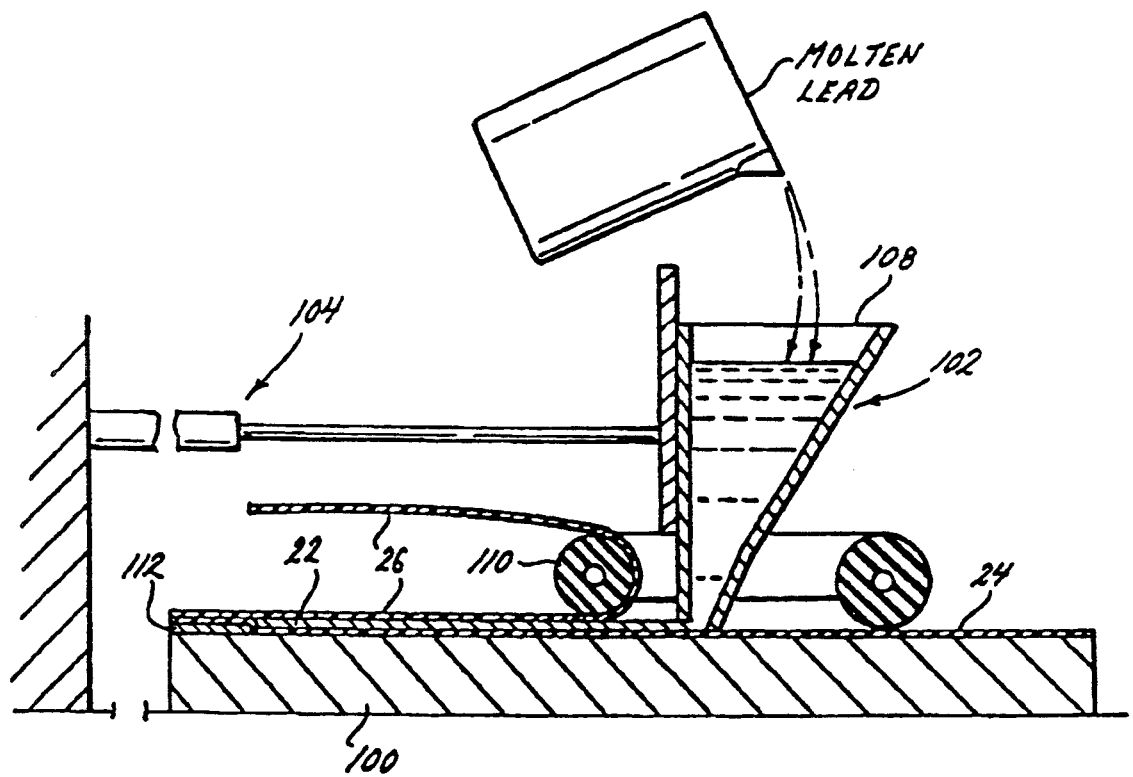
FIG. 2 is a diagrammatio view of an apparatus suitable for making the two-sided lead composite of the present invention, and illustrating the method of making the two-sided lead composite.

A two-sided lead composite constructed according to the principles of this invention, indicated generally as 20, is shown in cross-section in FIG. 1. The composite 20 comprises a layer 22 of lead or an alloy comprising lead. The layer 22 has first and second sides, and is preferably between about 0.001 and about 0.050 inches thick, and most preferably between about 0.005 and about 0.015 inches thick. The composite also comprises a first layer 24 of a porous, non-metallic material mechanically bonded to the first side of the lead layer 22. The first layer 24 is preferably a fiberglass, but could be paper, cloth, wood, or gypsum board. The composite 20 also comprises a second layer 26 of a flexible, porous, non-metallic material mechanically bonded to the second side of the lead layer 22. The second layer is preferably fiberglass, but could also be cloth or paper. It is preferable that the material be high strength. For battery applications it is desirable that the material be resistant to sulfuric acid, and it may also be desirable to include conductive carbon fibers in the material. The preferred material for the first and second layers 24 and 26 is fiberglass mat that is between about 0.001 and about 0.050 inches thick, and more preferably between about 0.003 and about 0.010 inches thick. Suitable material is available from the Manville Corporation, Denver, Colo.

Figures 3, 4:
FIG. 3 is a photograph of one side of a two-sided lead composite constructed according to the principles of this invention.
FIG. 4 is a photograph of the other side of the two-sided lead composite shown in FIG. 3.

FIGS. 3 and 4 show the appearance of a two-sided lead composite according to the principles of this invention. The composite is made from two layers of fiberglass mat.

The apparatus for making the two-sided lead composite of this invention comprises a steel platform 100 having dimensions of 48 inches by 96 inches, and a dispenser 102 operable by an air cylinder 104 to traverse the platform 100. The dispenser 102 comprises a hopper 108 that can hold and dispense molten lead in a generally straight line, generally transverse to the direction of travel of the dispenser 102. The dispenser 102 also comprises a roller 110, made from hard rubber or another heat resistant substance.

According to the method of this invention, a piece of brown wrapping paper 112 is cut to a size of about 12 inches wide and a length of at least the width of the platform 100 (in this preferred embodiment about 48–54 inches long). With the cylinder 104 in its extended position so that the dispenser 102 is at the far end of the platform 100, the paper 112 is placed on the near end of the platform so that the first foot of the platform is covered with the paper. The paper 112 can be secured with masking tape.

The cylinder 104 is then actuated to bring the dispenser 102 to the near end of the platform 100, until the dispenser 102 is over the paper 112. The paper 112 is under the roller, and is held in place by the weight of the dispenser 102. The paper 112 should be smooth and unwrinkled, if it is not, the dispenser 102 should be moved and the paper 112 replaced.

A first layer 24 of a porous, non-metallic material, preferably a sheet of fiberglass, 4 feet wide and six to eight feet long is laid on the platform 100, and the end of the sheet is slid under the paper until it reaches the roller 110. The layer 24 extends about six inches underneath the paper, with the paper resting smoothly on top of it. The sides of the fiberglass are aligned with the sides of the platform 100, so that the platform 100 is covered except for the last one to three feet of the far end.

Rather than a single sheet of fiberglass, the first layer 24 can comprise a plurality of strips of fiberglass battery separator material. This material typically comes in rolls about six inches wide and about one hundred feet long. Six foot lengths of the battery separator material are cut from the roll and carefully lined up on the platform 100. The separator strips should touch, but not overlap.

The dispenser 102 is raised, for example with a screw jack. The dispenser has guides (not shown) that engage rails (not shown) on the sides of the platform 100. These guides wrap around the rails, much like roller coaster cars on a track, and limit the upward travel of the dispenser 102. However, the dispenser can be lifted about one half inch, which is sufficient to thread a second layer 26 of porous, non-metallic material (also preferably of fiberglass) between the hopper 108 and the frame, and under the roller 110. While layer 24 could, if desired, be rigid, layer 26 must be flexible. The layer 26 is aligned with the edge of the platform 100. The end of the sheet is kept parallel with the end of the platform 100, so that the side edges of the layer 26 will be parallel with the side edges of the layer 24. If desired, the first layer 24 can be moved under the roller while the dispenser 102 is raised. The dispenser 102 is then lowered, so that the roller 110 is rests on the second layer 26, the paper 112, and the first layer 24, and the platform 100.

The hopper 108 is divided into two halves to help distribute the lead evenly. An operator stands on each side of the platform, with a ladle containing 20 to 25 pounds of molten lead. The lead is melted in a small melting pot nearby. The optimum temperature appears to be between about 950° F. and 1000° F., and preferably about 975° F. The two operators simultaneously empty their ladles into hopper 108. One of the operators actuates the air cylinder 104, and the cylinder moves the dispenser 102 toward the far end of the coating platform at a speed of about 165 feet per minute. The coating process works at speeds as low as 60 feet per minute, but the process appears to improve as the speed increases. It is expected that further improvement would be noted at speeds greater than 165 feet per minute. It is believed that a range of 50 feet to about 250 feet per minute is the preferred range.

As the dispenser 102 moves toward the far end of the platform 100, it pulls the second layer 26 through the space between the hopper and the hopper frame. The roller 110 presses the second layer 26 into the molten lead, and presses the molten lead into the first layer 24. The excess lead is pushed ahead of the roller and also off the sides of the platform. The temperature of the molten lead is somewhat less than the original 975° F., due to loss of heat to the hopper, but it is still above the solidification temperature of lead at 621° F. This allows the lead to have sufficient fluidity to spread across the platform 100, and to penetrate the matrix of both layers 24 and 26. At the same time, the lead is not so hot that it damages the layers 24 and 26 or the roller 110.

The composite has a number of uses but it is particularly adapted for battery applications. The two-sided composite allows a significant reduction in the amount of lead used in a battery grid while maintaining the strength and other mechanical properties of the grid. The two-sided composite is already enveloped and thus is easy to handle and does not require further processing before incorporation into a battery. Moreover, depending upon the thickness of the layers 24 and 26, the composite can hold battery paste. The composite product is flexible and can be used in developing a jelly-roll (spiral wound) battery design.

Of course the method could be easily scaled up or adapted to a continuous process.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limited sense.

What is claimed is:

1. A composite lead sheet product comprising:
   a layer of lead or lead alloy having first and second surfaces, and a thickness of between about 0.001 and about 0.050;
   a first layer of a porous, non-metallic material mechanically bonded to the first surface of the lead layer; and
   a second layer of porous, non-metallic material mechanically bonded to the second surface of the lead layer.

2. The composite lead sheet product according to claim 1 wherein the porous, non-metallic material of the first and second layers is flexible.

3. The composite lead sheet product according to claim 1 wherein the porous, non-metallic material of the second layer is fiberglass having a thickness of between about 0.001 and about 0.050 inches thick.

4. The composite lead sheet product according to claim 3 wherein the porous, non-metallic material of the first layer is fiberglass having a thickness of between about 0.001 and about 0.050 inches thick.

5. A method of making a composite lead sheet product comprising the steps of:
   supporting a first layer of a porous, non-metallic sheet material on a heat sink;

dispensing molten lead or lead alloy transversely across the first layer;

applying a second layer of a porous, non-metallic sheet material over the dispensed molten lead;

pressing the second layer into the molten lead and pressing the molten lead into the first layer with a roller, to mechanically bond the first and second layers to the lead.

6. The method according to claim 5 wherein the lead is dispensed at a temperature of between about 950° F. and about 1000° F.

* * * * *